(12) United States Patent
Peden et al.

(10) Patent No.: US 9,792,627 B1
(45) Date of Patent: Oct. 17, 2017

(54) PLATFORM-AWARE COMMERCIAL CONTENT RESOLUTION

(71) Applicant: Sprint Communications Company L.P., Overland Park, KS (US)

(72) Inventors: Mark D. Peden, Olathe, KS (US); Raymond E. Reeves, Oviedo, FL (US); Simon Youngs, Overland Park, KS (US)

(73) Assignee: SPRINT COMMUNICATIONS COMPANY L.P., Overland Park, KS (US)

( * ) Notice: Subject to any disclaimer, the term of this patent is extended or adjusted under 35 U.S.C. 154(b) by 349 days.

(21) Appl. No.: 13/734,924

(22) Filed: Jan. 5, 2013

(51) Int. Cl.
*G06Q 30/02* (2012.01)
*G06F 15/16* (2006.01)

(52) U.S. Cl.
CPC ......... *G06Q 30/0267* (2013.01); *G06F 15/16* (2013.01)

(58) Field of Classification Search
CPC . H04W 28/02; H04W 28/0215; H04W 48/06; H04W 8/082; G06C 30/0241; H04L 67/306; G06F 17/30899; G06Q 30/0277
USPC .............................. 370/252, 235; 705/14.64
See application file for complete search history.

(56) References Cited

U.S. PATENT DOCUMENTS 8,548,848 B1 * 10/2013 Shaw et al. .................. 705/14.1
8,887,085 B1 * 11/2014 Cox et al. ..................... 715/786
2010/0262456 A1 * 10/2010 Feng et al. ...................... 705/10
2012/0011430 A1 * 1/2012 Parker et al. .................. 715/234
2012/0233287 A1 * 9/2012 Queru et al. ................... 709/217
2013/0232000 A1 * 9/2013 van Datta et al. ......... 705/14.45
2014/0006161 A1 * 1/2014 Jabara et al. .............. 705/14.57

OTHER PUBLICATIONS https://web.archive.org/web/20111031012908/http://amazonsilk.wordpress.com/.*
https://www.youtube.com/watch?v=LT4N0yEByM8.*
http://en.wikipedia.org/wiki/Amazon_Silk.*
https://www.tipsandtricks-hq.com/a-cloud-with-a-silk-lining-the-kindle-fire-3841.*

* cited by examiner

*Primary Examiner* — Fonya Long
*Assistant Examiner* — Kyle Robinson

(57) ABSTRACT

A method of resolving commercial content on a mobile communication device comprises determining whether to delegate interaction with an intelligent content distributor to the mobile communication device, wherein the interaction is related to resolving commercial content, wherein resolving commercial content comprises processing redirections of the commercial content, and wherein the commercial content comprises at least one of text, images, video, and other data intended to market a good or service; delaying resolving commercial content until the commercial content is to be displayed on the mobile communication device; caching commercial content on the mobile communication device; resolving, upon a request for the commercial content, a cached version of the commercial content; and prioritizing distribution of the commercial content based on characteristics of at least one of a requesting application and a user.

20 Claims, 8 Drawing Sheets

PLATFORM-AWARE COMMERCIAL CONTENT RESOLUTION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices are becoming increasingly intertwined with our daily lives. The widespread and frequent use of mobile communication devices provides many opportunities for presenting commercial content, for example commercial content that is delivered and/or presented in association with a webpage accessed by the device. The commercial content may be displayed in functions and applications native to the mobile communication devices and in third-party applications installed on the mobile communication devices. The commercial content provides opportunities for intelligent content distributors that originate the commercial content to advertise their own goods and services or advertise the goods and services of other content distributors and entities. The commercial content further provides opportunities for wireless service providers and webpage publishers to earn revenue by providing opportunities for presenting commercial content. The resolving of commercial content may slow down functionality of mobile communication devices and may have other implications for user satisfaction with the mobile communication device and wireless service. Resolving commercial content may comprise processing redirections of commercial content, in other words, determining and obtaining actual addresses of commercial content based on temporary addresses of that commercial content that may be embedded in the webpage source, for example embedded as references such as universal resource locators (URLs) in the hypertext markup language (HTML) webpage source or in the extensible markup language (XML) webpage source.

SUMMARY

In an embodiment, a method for resolving commercial content on a mobile communication device is disclosed. The method comprises determining whether to delegate interaction with an intelligent content distributor to the mobile communication device, wherein the interaction is related to resolving commercial content, wherein resolving commercial content comprises processing redirections of the commercial content, and wherein the commercial content comprises at least one of text, images, video, and other data intended to market a good or service; and delaying resolving commercial content until the commercial content is to be displayed on the mobile communication device.

In another embodiment, a method for resolving commercial content on a mobile communication device is disclosed. The method comprises caching commercial content on the mobile communication device, wherein the commercial content comprises at least one of text, images, video, and other data intended to market a good or service; resolving, upon a request for the commercial content, a cached version of the commercial content, wherein resolving commercial content comprises processing redirections of the commercial content; and prioritizing distribution of the commercial content based on characteristics of at least one of a requesting application and a user.

In yet another embodiment, a method for resolving commercial content on a mobile communication device is disclosed. The method comprises determining whether to delegate interaction with an intelligent content distributor to the mobile communication device, wherein the interaction is related to resolving commercial content, wherein resolving commercial content comprises processing redirections of the commercial content, and wherein the commercial content comprises at least one of text, images, video, and other data intended to market a good or service; delaying resolving commercial content until the commercial content is to be displayed on the mobile communication device; caching commercial content on the mobile communication device; resolving, upon a request for the commercial content, a cached version of the commercial content; and prioritizing distribution of the commercial content based on characteristics of at least one of a requesting application and a user.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The resolving of commercial content (CC) may slow down the functionality of mobile communication devices (MCDs) and may have other implications for user satisfaction with the mobile communication device and wireless service. Resolving commercial content may comprise processing redirections of commercial content, in other words, determining and obtaining actual addresses of commercial content based on addresses of or reference to that commercial content that may be embedded in the webpage source, for example embedded as references such as universal resource locators (URLs) in the hypertext markup language (HTML) webpage source or in the extensible markup language (XML) webpage source. In an embodiment, resolving may further comprise requesting and receiving the referenced content, such as advertising or marketing content, from a content provider. The present disclosure teaches methods of improving the resolving of commercial content in order to improve the user's experience with the mobile communication device and the wireless service. For example, resolving of commercial content typically entails interaction between the mobile communication device and an intelligent content distributor (ICD) with a webpage provider (WPP) serving as an intermediary. If, however, the mobile communication device has specific capabilities, then the webpage provider, an application of the mobile communication device, or another entity may delegate some or all of the interaction to the mobile communication device so that the interaction occurs directly between the mobile communication device and the intelligent content distributor.

As another example, resolving commercial content may take additional time and network resources as the amount of commercial content increases. The commercial content may therefore resolve only when it is to be displayed on the mobile communication device. In addition, the mobile communication device may cache commercial content and recall that commercial content when it is to be displayed on the mobile communication device. As yet another example, a single mobile communication device may have multiple applications that resolve commercial content. Some applications may therefore be given priority for resolving commercial content. Similarly, there may be multiple mobile communication device users on a network. Resolving commercial content may therefore be prioritized among those users.

Figure 1:
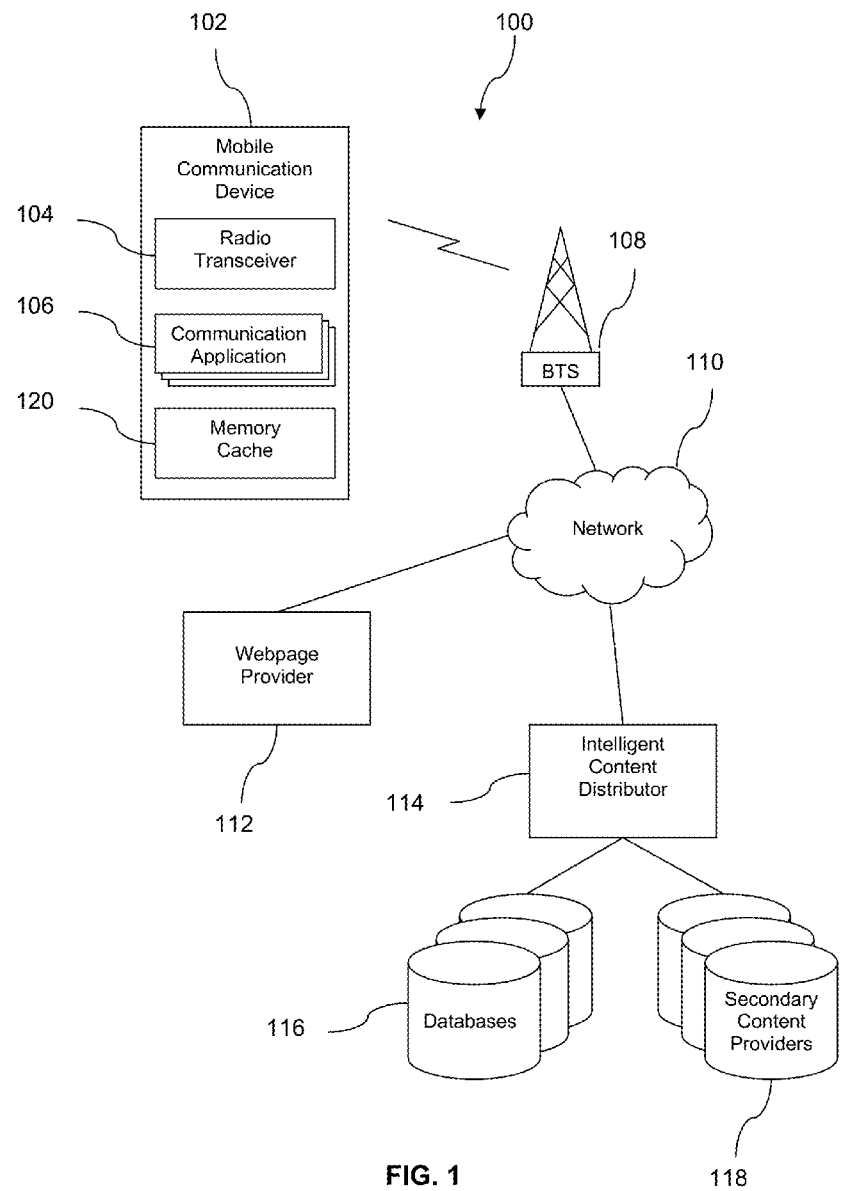
FIG. 1 is an illustration of a communication system according to an embodiment of the disclosure.

Turning now to FIG. 1, a communication system 100 is described. The communication system 100 may comprise a plurality of mobile communication devices 102. The mobile communication device 102 may comprise a radio transceiver 104, a plurality of communication applications 106, and a memory cache 120. The mobile communication device 102 is configured to use the radio transceiver 104 to establish a wireless communication link with a base transceiver station (BTS) 108, and the base transceiver station 108 provides communications connectivity of the mobile communication device 102 to a network 110. The network 110 may comprise any combination of private and public networks.

It is understood that the communication system 100 may comprise any number of mobile communication devices 102 and any number of base transceiver stations 108. The collectivity of base transceiver stations 108 may be said to comprise a radio access network in that these base transceiver stations 108 may provide radio communication links to the mobile communication devices 102 to provide access to the network 110. The radio access network may be abstracted in different ways and may comprise, in addition to the base transceiver stations 108, servers and data stores such as home location registers (HLRs) or servers that implement the functionality of home location registers, visitor location registers (VLRs) or servers that implement the functionality of visitor location registers, base station controllers (BSCs), mobile switching centers (MSCs), and other network nodes that are specifically associated with providing wireless access and connectivity to the mobile communication devices 102.

The radio transceiver 104 may communicate with the base transceiver station 108 using any of a variety of wireless communication protocols including a code division multiple access (CDMA), a global system for mobile communication (GSM), a long-term evolution (LTE), a world-wide interoperability for microwave access (WiMAX), or another wireless communication protocol. The mobile communication device 102 may be any of a mobile phone, a personal digital assistant (PDA), a media player, a wireless enabled computer, or another mobile communication device. The mobile communication device 102 may have other components (not shown) such as a near field communication (NFC) radio transceiver, a wireless local area network (WLAN) radio transceiver, or other components. The mobile communication device 102 may be a desktop computer or other communication device that communicates with the network 110 in a wired or wireless manner. In that case, the base transceiver station 108 may not be implemented.

The communication application 106 may be a voice communication, a data communication, a web browser, an email, a short message system (SMS) or texting, a multimedia message system (MMS), a gaming, or another communication application. The communication application 106 may be a standard communication application that is delivered by an original equipment manufacturer (OEM) that assembles the mobile communication device 102. The communication application 106 may also be a third-party application that is installed on the mobile communication device 102 by a user, for example, after the mobile communication device 102 is sold to the user. The communication application 106 may be stored as firmware or software in a memory area of the mobile communication device 102.

The memory cache 120 may be a virtually indexed direct-mapped cache, an associative cache, or another suitable cache. When called upon by the communication application 106 or another function or application of the mobile communication device 102, the memory cache 120 may retrieve data that may be stored on a memory. The memory cache 120 may be dedicated to a single function or application, or the memory cache 120 may be used by any combination of functions or applications.

The mobile communication device 102 may communicate with a webpage provider 112 through the base transceiver station 108 and network 110. The webpage provider 112 may make webpages available over the network 110 to the mobile communication device 102 and other endpoints in a network. The mobile communication device 102 may initiate contact with the webpage provider 112 through the network 110 by entering a Uniform Resource Locator (URL) into the communication application 106, which, as described above, may be a web browser application. A Uniform Resource Locator is an address associated with a particular webpage on the World Wide Web. After establishment of a connection between the mobile communication device 102 and the webpage provider 112, the mobile communication device 102 may download the webpage associated with the URL. The webpage may comprise text, images, video, and other data. The webpage may also comprise advertising inventory, which may be opportune locations in a medium to display commercial content. In this instance, the medium may be the webpage. In other words, the advertising inventory may comprise empty spaces for commercial content to be inserted into. For instance, a news or social media webpage may have available its primary text, images, video, and other data in the left and middle portions of the webpage and have available advertising inventory in the right portion of the webpage.

The advertising inventory may be segregated into different portions to permit a plurality of commercial content. The commercial content may comprise text, images, video, and other data intended to market a good or service. For instance, commercial content may be an advertisement for an automobile appearing on a webpage. Instead of advertising inventory available on a webpage, if the communication application 106 is a gaming application, for instance, then the advertising inventory may exist anywhere on the graphical user interface (GUI) of the gaming application. For instance, a gaming application may have available its gaming content in the center portion of the graphical user interface and have available advertising inventory in the bottom portion of the graphical user interface.

While the webpage provider 112 may provide the webpage that comprises the advertising inventory, an intelligent content distributor 114, or advertiser, may provide the commercial content to be displayed in the advertising inventory. The webpage provider 112 may communicate with the intelligent content distributor 114 through the network 110. The intelligent content distributor 114 may provide commercial content that is targeted to the user of the mobile communication device 102. For instance, the commercial content may be provided to the user of the mobile communication device 102 based on a profile of the user, which may indicate that the user has a particular interest in automobiles. The interest in automobiles may be determined based on the user's browsing history. The intelligent content distributor 114 may select commercial content from databases 116. The intelligent content distributor 114 may also serve as an aggregator of commercial content by retrieving commercial content from other secondary content providers 118.

When the webpage, including the commercial content, is downloaded to the mobile communication device 102 and displayed to the user, the user may choose to respond to the commercial content, for instance, by clicking on the commercial content. When the user clicks on the commercial content, a new webpage associated with the commercial content may download to, and display on, the mobile communication device 102. The webpage may display in a new window or tab of the communication application 106 or the webpage may display in a window or tab that is already in use.

In some instances, the webpage provider 112 or another entity may count an impression, or view, when the commercial content is downloaded by the mobile communication device 102 or displayed in the communication application 106. In a present embodiment, the webpage provider 112 or another entity may count an impression only when the user actually views the commercial content. In other words, commercial content may be rendered in the communication application 106, but may not yet be visible on a screen of the mobile communication device 102 if, for instance, the commercial content is at the bottom of a webpage and has not yet been scrolled to. In such a case, the user may need to scroll down to the commercial content for an impression to be counted. The webpage provider 112 or another entity may also count each click by the user. The webpage provider 112 or another entity may make logs associated with the impressions and clicks and provide those logs to other entities, including the intelligent content distributor 114. In turn, the intelligent content distributor 114 or other entity may provide a form of payment to the webpage provider 112 or another entity in exchange for each impression or click.

Figure 2:
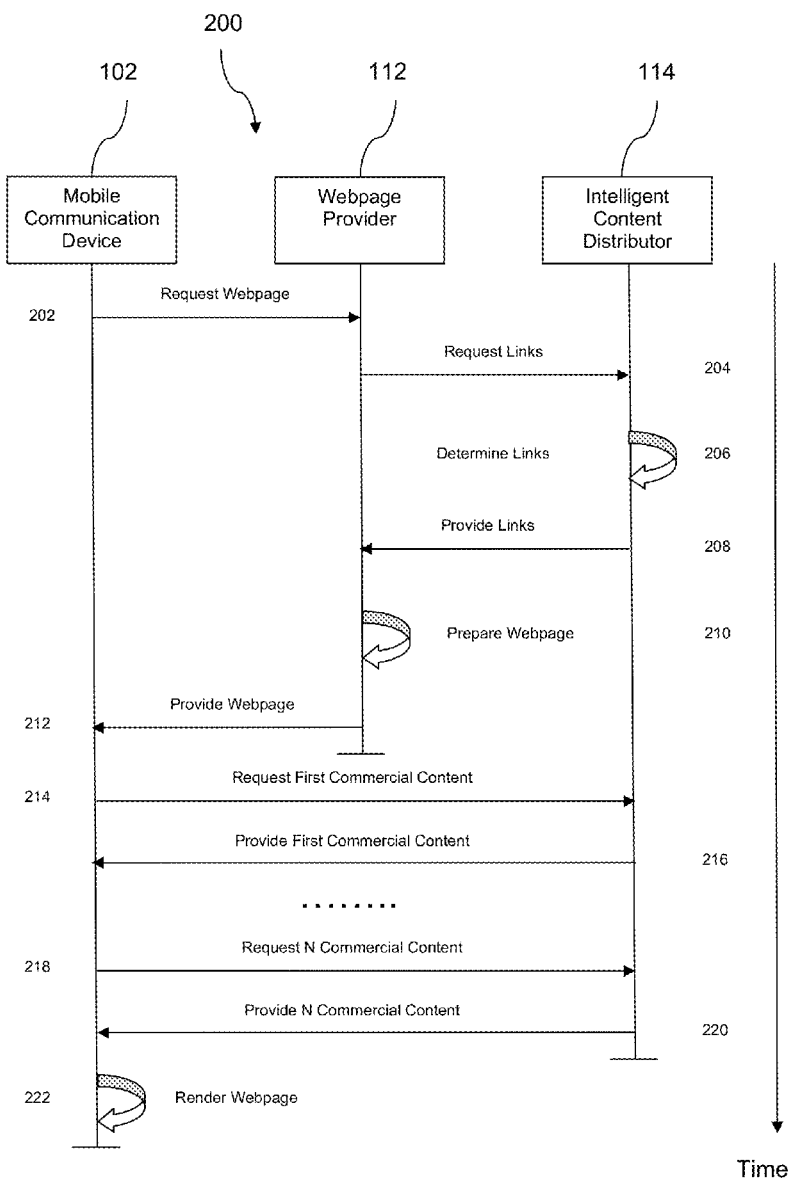
FIG. 2 is a message sequence diagram of a system for resolving commercial content.

Turning now to FIG. 2, a message sequence diagram of a system 200 for resolving commercial content is described. Resolving commercial content may comprise processing redirections of commercial content, in other words, determining and obtaining actual addresses of commercial content based on temporary addresses of that commercial content that may be embedded in the webpage source, for example embedded as references such as universal resource locators (URLs) in the hypertext markup language (HTML) webpage source or in the extensible markup language (XML) webpage source. At step 202, the mobile communication device 102 may request through the communication application 106 a webpage from the webpage provider 112. As discussed above, the mobile communication device 102 user may make the request by entering a Uniform Resource Locator into the communication application 106. Each of the proceeding steps involving the mobile communication device 102 may or may not be understood to occur through the communication application 106.

At step 204, the webpage provider 112 may request from the intelligent content distributor 114 links to commercial content. In its request, the webpage provider 112 may provide details of a size and shape of advertising inventory available on the webpage.

At step 206, the intelligent content distributor 114 may determine links to commercial content it will send to the webpage provider 112. As described above, the intelligent content distributor 114 may target the links based on the user's profile. The intelligent content distributor 114 may determine that the commercial content associated with the links is available from the databases 116 or the secondary content providers 118. The intelligent content distributor 114 may provide commercial content based on the size and shape of the advertising inventory, or the intelligent content distributor 114 may provide links to content that is formed in order to comply with the size and shape of the advertising inventory.

At step 208, the intelligent content distributor 114 may provide to the webpage provider 112 one or a plurality of links to commercial content. The links may be Uniform Resource Locators to other webpages where commercial content is present.

At step 210, the webpage provider 112 may prepare the webpage by collecting the primary text, images, video, and other data in a file formatted in a way that the mobile communication device 102 may understand it. For instance, the webpage may be coded using Extensible Markup Language (XML). In addition to the primary text, images, video, and other data, the webpage provider 112 may include the links provided by the intelligent content distributor 114.

At step 212, the webpage provider 112 may provide the webpage to the mobile communication device 102.

At step 214, the mobile communication device 102 may request a first piece of commercial content from the intelligent content distributor 114 by executing a link provided at step 208. The intelligent content distributor may forward the request to the databases 116 or the secondary content providers 118.

At step 216, the intelligent content distributor 114 may provide the first piece of commercial content requested at step 214. The first piece of commercial content may originate from the databases 116 or the secondary content providers 118.

The requesting and providing of commercial content may continue until, at steps 218 and 220, the last pieces of commercial content are requested and provided.

At step 222, the mobile communication device 102 may render the webpage, including the primary text, images, and video, as well as the commercial content. Rendering may comprise displaying the webpage, which may be accomplished by executing code from the webpage.

Figure 3:
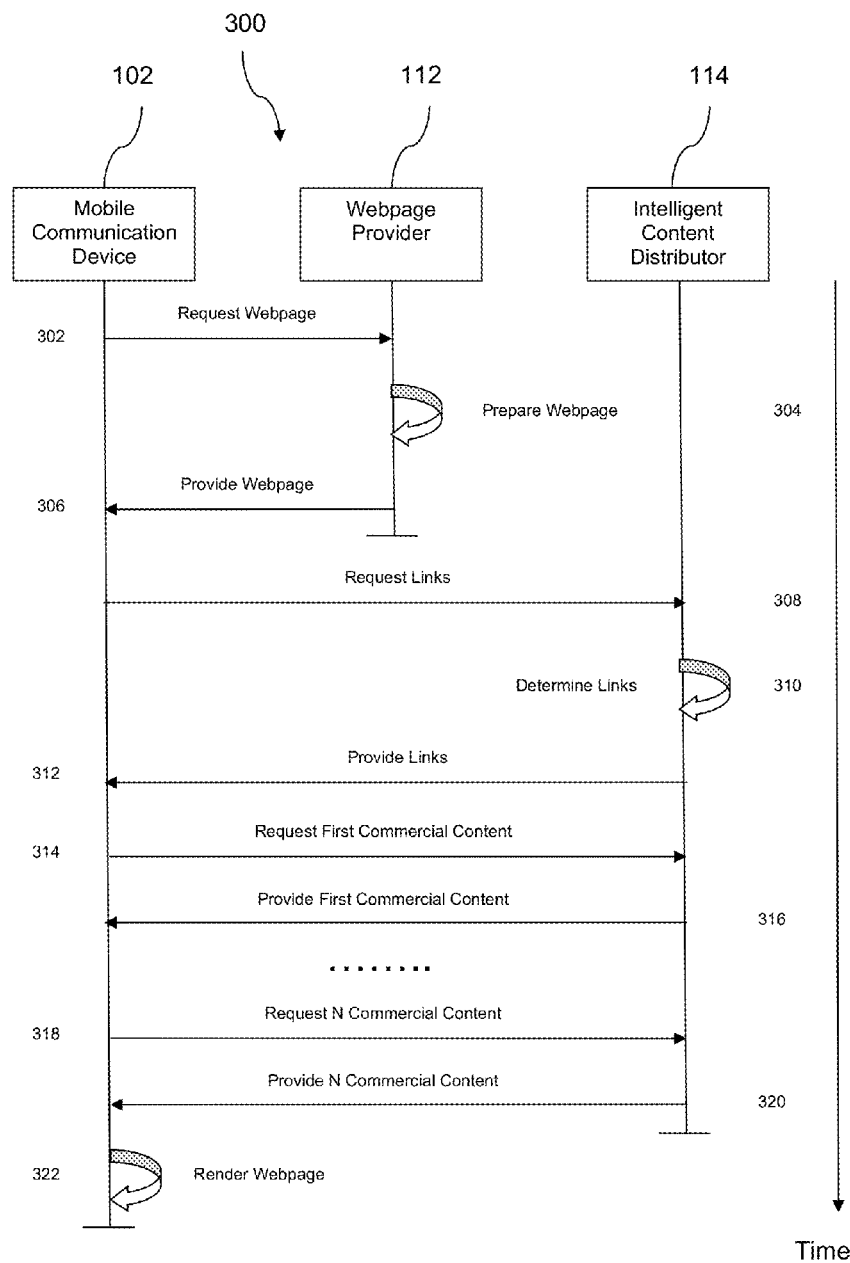
FIG. 3 is a message sequence diagram of another system for resolving commercial content according to an embodiment of the disclosure.

Turning now to FIG. 3, a message sequence diagram of another system 300 for resolving commercial content is described. At step 302, the mobile communication device 102 may request through the communication application 106 a webpage from the webpage provider 112. The mobile communication device 102 user may make that request by entering a Uniform Resource Locator into the communication application 106. Each of the proceeding steps involving the mobile communication device 102 may be understood to occur through the communication application 106.

At step 304, the webpage provider 112 may prepare the webpage. The webpage provider 112 may prepare the webpage by collecting the primary text, images, video, and other data in a file formatted in a way that the mobile communication device 102 may understand it. For example, the webpage may be coded using Extensible Markup Language (XML). This time, however, the webpage may not have links provided from the intelligent content distributor 114. Rather, a delegator, which may be the webpage provider 112, an application of the mobile communication device 102, or another entity, may choose to delegate to the mobile communication device 102 the responsibility of engaging the intelligent content distributor 114 for purposes of resolving commercial content. In that case, the webpage provider 112 may provide to the mobile communication device 102 a webpage with advertising inventory, but not links to commercial content. The delegator may choose to delegate some or all of the interaction with the intelligent content distributor 114 for various reasons. For example, if a speed of resolving commercial content is equal to or greater than a threshold, then the delegator may choose to delegate some or all of the interaction. Otherwise, if the speed of resolving commercial content is less than the threshold, then the resolving of commercial content may occur as shown in the system 200 of FIG. 2. Alternatively, if the mobile communication device 102 meets at least one criterion, then the delegator may choose to delegate some or all of the interaction. The criterion may be related to an ability of the mobile communication device 102 to communicate directly with the intelligent content distributor 114, an ability to process advertising inventory and request commercial content accordingly, or some other ability. The delegator may consider multiple mobile communication device 102 criteria when determining whether to delegate some or all of the interaction. Otherwise, if the mobile communication device 102 does not meet the at least one criterion, then the resolving of commercial content may occur as shown in the system 200 of FIG. 2.

At step 306, the webpage provider 112 may provide the webpage to the mobile communication device 102.

At step 308, the mobile communication device 102 may request from the intelligent content distributor 114 links to commercial content. In its request, the mobile communication device 102 may provide details of the size and shape of advertising inventory available on the webpage.

At step 310, the intelligent content distributor 114 may determine links to commercial content it will send to the mobile communication device 102. As described above, the intelligent content distributor 114 may target the links based on the user's profile. The intelligent content distributor 114 may determine that the commercial content associated with the links is available from the databases 116 or the secondary content providers 118.

At step 312, the intelligent content distributor 114 may provide to the mobile communication device 102 one or a plurality of links to commercial content. The links may be Uniform Resource Locators to other webpages where commercial content is present.

At step 314, the mobile communication device 102 may request a first piece of commercial content from the intelligent content distributor 114 by executing a link provided at step 312. The intelligent content distributor may forward the request to the databases 116 or the secondary content providers 118. Alternatively, the mobile communication device 102 may have previously stored on the memory cache 120 the commercial content associated with the links provided at step 312. An algorithm residing on a memory or other component of the mobile communication device 102 may determine when to cache commercial content and what commercial content to cache. If commercial content is cached on the mobile communication device 102, then the mobile communication device 102 may simply recall the cached commercial content when needed. Furthermore, the mobile communication device 102 may discontinue caching if an amount of unused memory on the mobile communication device 102 is less than a threshold. The mobile communication device 102 may employ other rules in order to maintain memory space.

At step 316, the intelligent content distributor 114 may provide the first commercial content requested at step 314. The first commercial content may originate from the databases 116 or the secondary content providers 118.

The requesting and providing of commercial content may continue until, at steps 318 and 320, the last pieces of commercial content are requested and provided. Alternatively, instead of requesting and providing the commercial content until all commercial content is resolved, an application of the mobile communication device 102 or another entity may delay resolving commercial content until that commercial content is to be displayed on the mobile communication device 102. This may occur, for example, if the user is viewing the webpage and the webpage has more content than what can appear on a screen of the mobile communication device 102. The user may therefore have to scroll up, down, or sideways to view the remaining webpage content, which may include the remaining advertising inventory. In the system 200 of FIG. 2, instead of the mobile communication device 102, the webpage provider 112 may delay resolving commercial content as described in this step.

Alternatively, the webpage provider 112, the intelligent content distributor 114, or another entity may prioritize distribution of the commercial content based on characteristics of the communication application 106, the user, or both. In a first example, distribution of commercial content may be given a higher priority if the communication application 106 is a web browser application or lower priority if the communication application 106 is a gaming application. In such a scenario, commercial content may be distributed first to the web browser application and second to the gaming application. In a second example, multiple mobile communication devices 102 may seek to resolve commercial content. In that case, distribution of commercial content may be given a higher priority to the mobile communication devices 102 associated with users who have a higher likelihood of purchasing a product or who have a higher likelihood of responding to commercial content. In such a scenario, commercial content may be distributed first to the mobile communication device 102 of a user who is more likely to purchase a product and second to the mobile communication device 102 of a user who is less likely to purchase a product. A higher likelihood of purchasing a product or a higher likelihood of responding to commercial content may be determined based on a profile of the user. For instance, the profile of the user may indicate that the user has significant purchasing power or a history of responding to commercial content by clicking on links and purchasing goods or services from websites associated with those links.

At step 322, the mobile communication device 102 may render the webpage, including the primary text, images, and video, as well as the commercial content. After the webpage is rendered, it can be said that the process of resolving commercial content is complete. The mobile communication device 102, the webpage provider 112, or another entity may then count an impression for each piece of commercial content. Alternatively, as described at steps 318 and 320, the webpage may have content that extends beyond the mobile communication device 102 screen. Rendering and resolving may therefore occur piecemeal as the user scrolls up, down, or sideways. In that case, the mobile communication device 102, the webpage provider 112, or another entity may then count an impression only upon the user scrolling to a piece of commercial content and the system 300 rendering that piece of commercial content.

Figure 4:
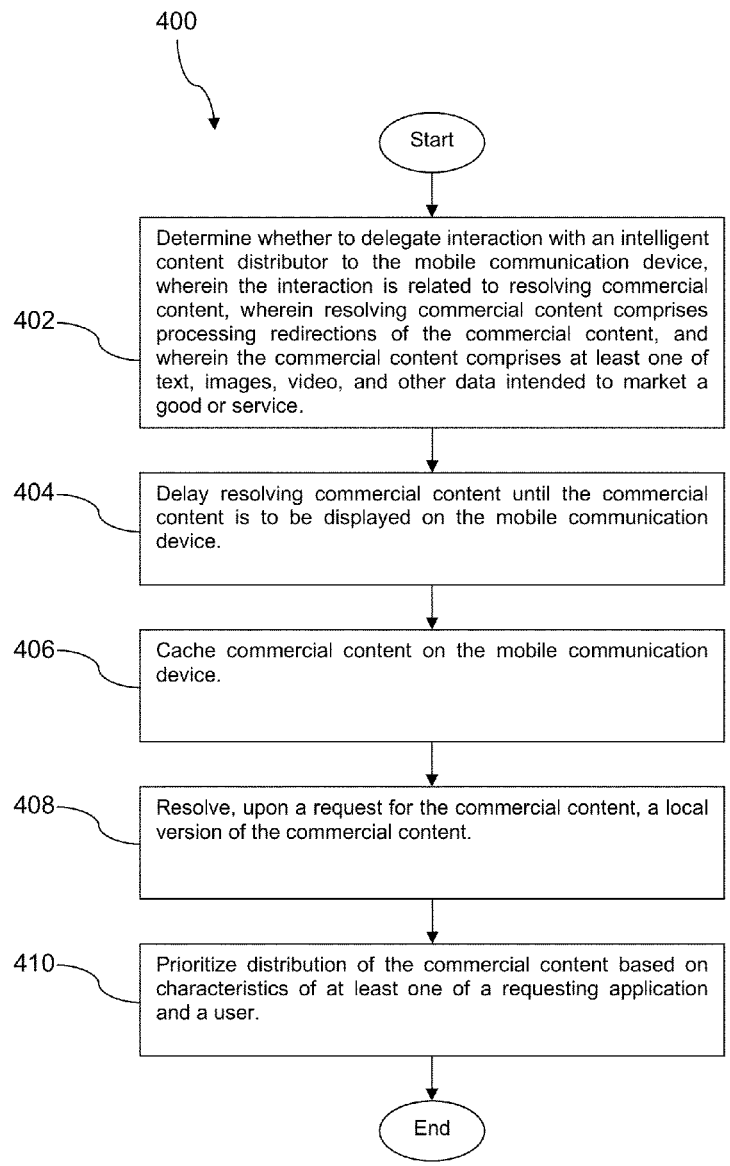
FIG. 4 is a flowchart illustrating a method of resolving commercial content according to an embodiment of the disclosure.

Turning now to FIG. 4, a method 400 of resolving commercial content on the mobile communication device 102 is described. At block 402, it is determined whether to delegate interaction with the intelligent content distributor 114 to the mobile communication device 102, wherein the interaction is related to resolving commercial content, wherein resolving commercial content comprises processing redirections of the commercial content, and wherein the commercial content comprises at least one of text, images, video, and other data intended to market a good or service. For example, the webpage provider 112, an application of the mobile communication device 102, or another entity may choose to delegate to the mobile communication device 102 some or all of the responsibility of engaging the intelligent content distributor 114 for purposes of resolving commercial content.

At block 404, resolving commercial content may be delayed until the commercial content is to be displayed on the mobile communication device 102. For example, if the user is viewing a webpage and the webpage has more content than what can appear on a screen of the mobile communication device 102, the user may have to scroll up, down, or sideways to view the remaining webpage content, which may include the remaining advertising inventory. In that case, the webpage provider 112, an application of the mobile communication device 102, or another entity may delay resolving the commercial content until the user scrolls to a portion of the advertising inventory where the commercial content is to be displayed.

At block 406, commercial content on the mobile communication device 102 may be cached. An algorithm residing on a memory or another component of the mobile communication device 102 may determine when to cache commercial content and what commercial content to cache.

At block 408, upon a request for the commercial content, a cached version of the commercial content may be resolved. For example, if the mobile communication device 102 is resolving commercial content that already exists on the memory cache 120, then the mobile communication device 102 may recall the commercial content from the memory cache 120 instead of obtaining the commercial content from the webpage provider 112 or intelligent content distributor 114.

At block 410, distribution of commercial content may be prioritized based on characteristics of at least one of a requesting application and a user. For example, a delegator, which may be the webpage provider 112, an application of the mobile communication device 102, or another entity, may choose to delegate to the mobile communication device 102 the responsibility of engaging the intelligent content distributor 114 for purposes of resolving commercial content. For example, if a speed of resolving commercial content is equal to or greater than a threshold, or if the mobile communication device 102 meets at least one criterion, then the delegator may choose to delegate some or all of the interaction with the intelligent content distributor 114.

Resolving and rendering commercial content may be an iterative and continual process. In addition, methods and protocols may change during that process. As a result, blocks 402 through 410 may be interchangeable so that the blocks may be performed in any order.

Figure 5:
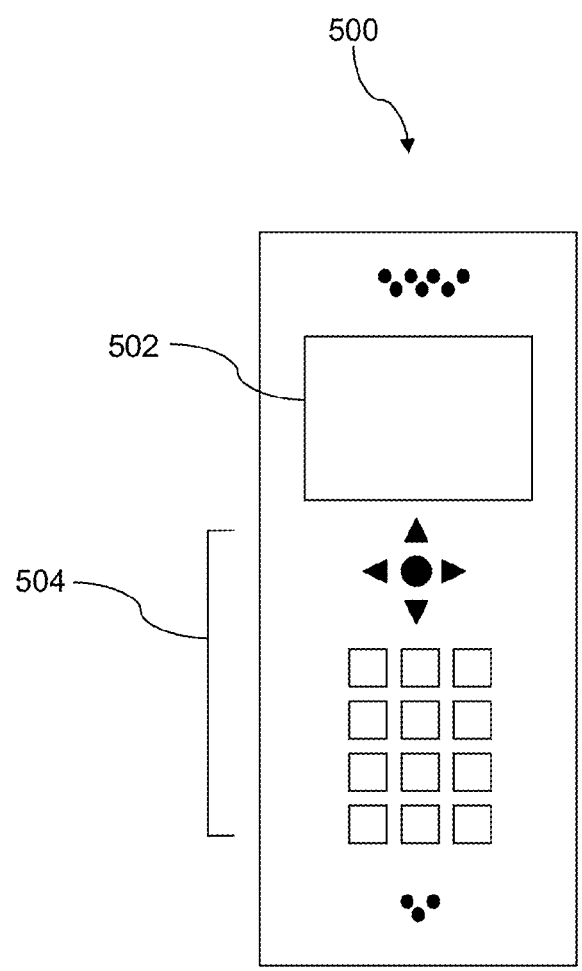
FIG. 5 is an illustration of a mobile communication device according to an embodiment of the disclosure.

Turning now to FIG. 5, a wireless communications system including the mobile device 500 is described. FIG. 5 depicts the mobile device 500, which is operable for implementing aspects of the present disclosure, but the present disclosure should not be limited to these implementations. Though illustrated as a mobile phone, the mobile device 500 may take various forms including a wireless handset, a pager, a personal digital assistant (PDA), a gaming device, or a media player. The mobile device 500 includes a display 502 and a touch-sensitive surface and/or keys 504 for input by a user. The mobile device 500 may present options for the user to select, controls for the user to actuate, and/or cursors or other indicators for the user to direct. The mobile device 500 may further accept data entry from the user, including numbers to dial or various parameter values for configuring the operation of the handset. The mobile device 500 may further execute one or more software or firmware applications in response to user commands. These applications may configure the mobile device 500 to perform various customized functions in response to user interaction. Additionally, the mobile device 500 may be programmed and/or configured over-the-air, for example from a wireless base station, a wireless access point, or a peer mobile device 500. The mobile device 500 may execute a web browser application which enables the display 502 to show a webpage. The webpage may be obtained via wireless communications with a base transceiver station, a wireless network access node, a peer mobile device 500 or any other wireless communication network or system.

Figure 6:
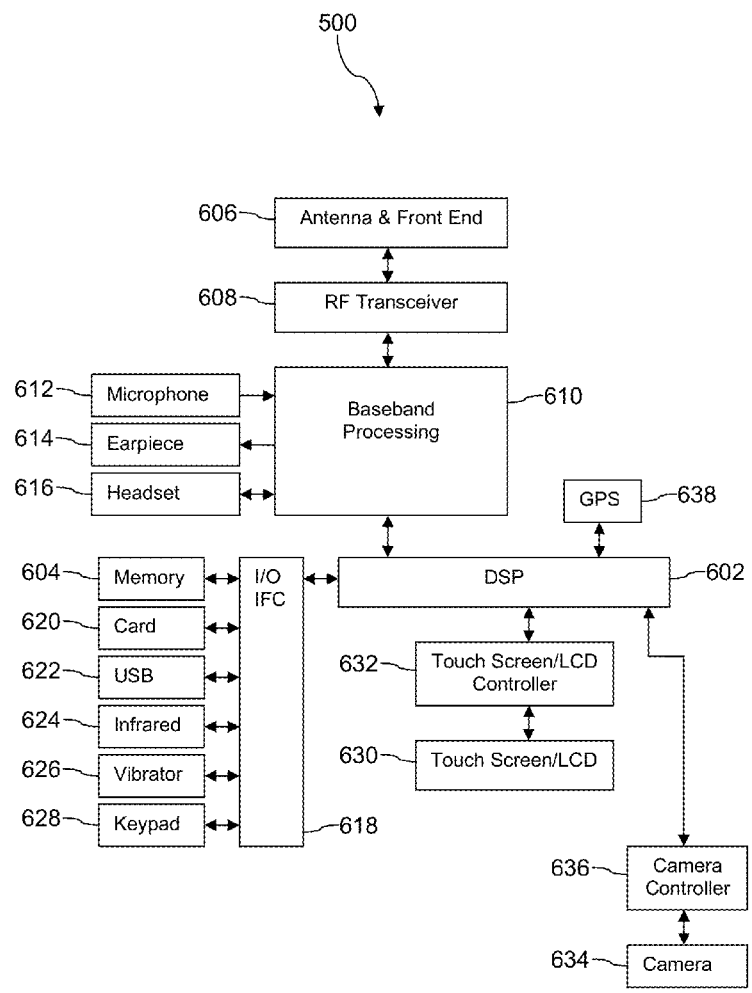
FIG. 6 is a block diagram of a mobile communication device according to an embodiment of the disclosure.

Turning now to FIG. 6, a block diagram of the mobile device 500 is described. While a variety of known components of handsets are depicted, in an embodiment a subset of the listed components and/or additional components not listed may be included in the mobile device 500. The mobile device 500 includes a digital signal processor (DSP) 602 and a memory 604. As shown, the mobile device 500 may further include an antenna and front end unit 606, a radio frequency (RF) transceiver 608, a baseband processing unit 610, a microphone 612, an earpiece speaker 614, a headset port 616, an input/output interface 618, a removable memory card 620, a universal serial bus (USB) port 622, an infrared port 624, a vibrator 626, a keypad 628, a touch screen liquid crystal display (LCD) with a touch sensitive surface 630, a touch screen/LCD controller 632, a camera 634, a camera controller 636, and a global positioning system (GPS) receiver 638. In an embodiment, the mobile device 500 may include another kind of display that does not provide a touch sensitive screen. In an embodiment, the DSP 602 may communicate directly with the memory 604 without passing through the input/output interface 618. Additionally, in an embodiment, the mobile device 500 may comprise other peripheral devices that provide other functionality.

The DSP 602 or some other form of controller or central processing unit operates to control the various components of the mobile device 500 in accordance with embedded software or firmware stored in memory 604 or stored in memory contained within the DSP 602 itself. In addition to the embedded software or firmware, the DSP 602 may execute other applications stored in the memory 604 or made available via information carrier media such as portable data storage media like the removable memory card 620 or via wired or wireless network communications. The application software may comprise a compiled set of machine-readable instructions that configure the DSP 602 to provide the desired functionality, or the application software may be high-level software instructions to be processed by an interpreter or compiler to indirectly configure the DSP 602.

The DSP 602 may communicate with a wireless network via the analog baseband processing unit 610. In some embodiments, the communication may provide Internet connectivity, enabling a user to gain access to content on the Internet and to send and receive e-mail or text messages. The input/output interface 618 interconnects the DSP 602 and various memories and interfaces. The memory 604 and the removable memory card 620 may provide software and data to configure the operation of the DSP 602. Among the interfaces may be the USB port 622 and the infrared port 624. The USB port 622 may enable the mobile device 500 to function as a peripheral device to exchange information with a personal computer or other computer system. The infrared port 624 and other optional ports such as a Bluetooth® interface or an IEEE 802.11 compliant wireless interface may enable the mobile device 500 to communicate wirelessly with other nearby handsets and/or wireless base stations.

The keypad 628 couples to the DSP 602 via the interface 618 to provide one mechanism for the user to make selections, enter information, and otherwise provide input to the mobile device 500. Another input mechanism may be the touch screen LCD 630, which may also display text and/or graphics to the user. The touch screen LCD controller 632 couples the DSP 602 to the touch screen LCD 630. The GPS receiver 638 is coupled to the DSP 602 to decode global positioning system signals, thereby enabling the mobile device 500 to determine its position.

Figure 7A:
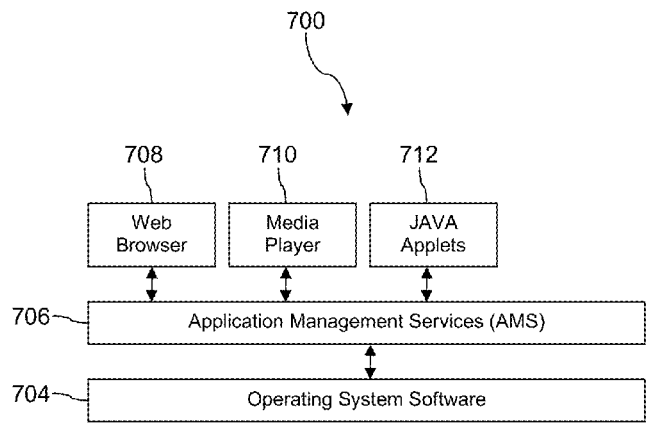
FIG. 7A is a block diagram of a software architecture of a mobile communication device according to an embodiment of the disclosure.

Turning now to FIG. 7A, a software environment 700 that may be implemented by the DSP 602 is described. The DSP 602 executes operating system software 704 that provides a platform from which the rest of the software operates. The operating system software 704 may provide a variety of drivers for the handset hardware with standardized interfaces that are accessible to application software. The operating system software 704 may be coupled to and interact with application management services (AMS) 706 that transfer control between applications running on the mobile device 500. Also shown in FIG. 7A are a web browser application 708, a media player application 710, JAVA applets 712. The web browser application 708 may be executed by the mobile device 500 to browse content and/or the Internet, for example when the mobile device 500 is coupled to a network via a wireless link. The web browser application 708 may permit a user to enter information into forms and select links to retrieve and view webpages. The media player application 710 may be executed by the mobile device 500 to play audio or audiovisual media. The JAVA applets 712 may be executed by the mobile device 500 to provide a variety of functionality including games, utilities, and other functionality.

Figure 7B:
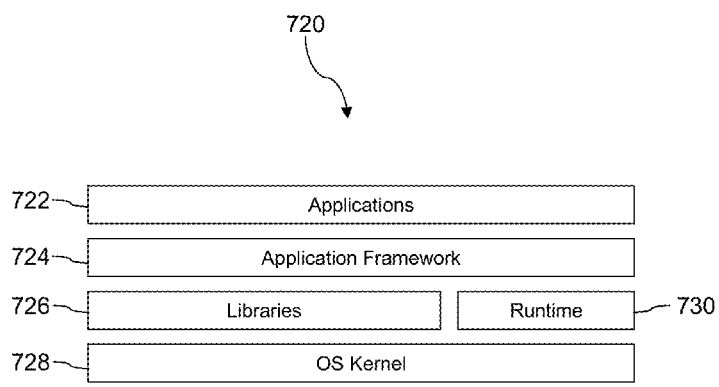
FIG. 7B is a block diagram of another software architecture of a mobile communication device according to an embodiment of the disclosure.

Turning now to FIG. 7B, an alternative software environment 720 that may be implemented by the DSP 602 is described. The DSP 602 executes operating system software 728 (for example an operating system kernel) and an execution runtime 730. The DSP 602 executes applications 722 that may execute in the execution runtime 730 and may rely upon services provided by the application framework 724. Applications 722 and the application framework 724 may rely upon functionality provided via the libraries 726.

Figure 8:
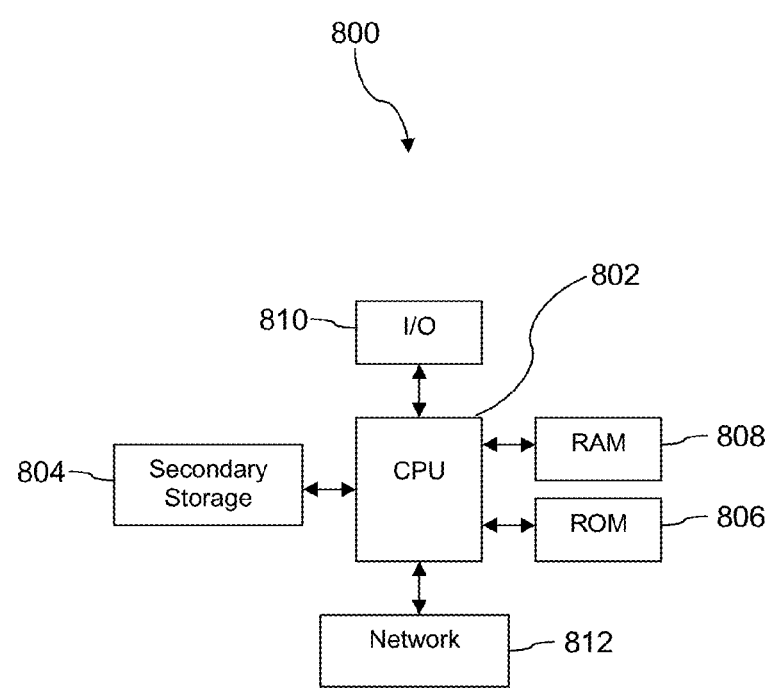
FIG. 8 illustrates an exemplary computer system suitable for implementing the several embodiments of the disclosure.

Turning now to FIG. 8, a computer system 800 suitable for implementing one or more embodiments disclosed herein is described. The computer system 800 includes a processor 802 (which may be referred to as a central processor unit or CPU) that is in communication with memory devices including secondary storage 804, read only memory (ROM) 806, random access memory (RAM) 808, input/output (I/O) devices 810, and network connectivity devices 812. The processor 802 may be implemented as one or more CPU chips.

It is understood that by programming and/or loading executable instructions onto the computer system 800, at least one of the CPU 802, the RAM 808, and the ROM 806 are changed, transforming the computer system 800 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software because re-spinning a hardware implementation is more expensive than re-spinning a software design. Generally, a design that is stable and will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner that a machine controlled by a new ASIC is a particular machine or apparatus, a computer that has been programmed and/or loaded with executable instructions may be viewed as a particular machine or apparatus.

The secondary storage 804 is typically comprised of one or more disk drives or tape drives and is used for non-volatile storage of data and as an over-flow data storage device if the RAM 808 is not large enough to hold all working data. The secondary storage 804 may be used to store programs which are loaded into the RAM 808 when such programs are selected for execution. The ROM 806 is used to store instructions and perhaps data which are read during program execution. The ROM 806 is a non-volatile memory device which typically has a small memory capacity relative to the larger memory capacity of the secondary storage 804. The RAM 808 is used to store volatile data and perhaps to store instructions. Access to both the ROM 806 and the RAM 808 is typically faster than to the secondary storage 804. The secondary storage 804, the RAM 808, and/or the ROM 806 may be referred to in some contexts as computer readable storage media and/or non-transitory computer readable media.

The I/O devices 810 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 812 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 812 may enable the processor 802 to communicate with the Internet or one or more intranets. With such a network connection, it is contemplated that the processor 802 might receive information from the network, or might output information to the network in the course of performing the above-described method steps. Such information, which is often represented as a sequence of instructions to be executed using the processor 802, may be received from and outputted to the network, for example, in the form of a computer data signal embodied in a carrier wave.

Such information, which may include data or instructions to be executed using the processor 802 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 802 executes instructions, codes, computer programs, scripts which it accesses from hard disk, floppy disk, optical disk (these various disk-based systems may all be considered secondary storage 804), the ROM 806, the RAM 808, or the network connectivity devices 812. While only one processor 802 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 804, for example, hard drives, floppy disks, optical disks, and/or other device, the ROM 806, and/or the RAM 808 may be referred to in some contexts as non-transitory instructions and/or non-transitory information.

In an embodiment, the computer system 800 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 800 to provide the functionality of a number of servers that is not directly bound to the number of computers in the computer system 800. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 800, at least portions of the contents of the computer program product to the secondary storage 804, to the ROM 806, to the RAM 808, and/or to other nonvolatile memory and volatile memory of the computer system 800. The processor 802 may process the executable instructions and/or data structures in part by directly accessing the computer program product, for example by reading from a CD-ROM disk inserted into a disk drive peripheral of the computer system 800. Alternatively, the processor 802 may process the executable instructions and/or data structures by remotely accessing the computer program product, for example by downloading the executable instructions and/or data structures from a remote server through the network connectivity devices 812. The computer program product may comprise instructions that promote the loading and/or copying of data, data structures, files, and/or executable instructions to the secondary storage 804, to the ROM 806, to the RAM 808, and/or to other non-volatile memory and volatile memory of the computer system 800.

In some contexts, the secondary storage 804, the ROM 806, and the RAM 808 may be referred to as a non-transitory computer readable medium or a computer readable storage media. A dynamic RAM embodiment of the RAM 808 likewise may be referred to as a non-transitory computer readable medium in that, while the dynamic RAM receives electrical power and is operated in accordance with its design, for example during a period of time during which the computer 800 is turned on and operational, the dynamic RAM stores information that is written to it. Similarly, the processor 802 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for resolving commercial content on a mobile communication device coupled to a wireless network, the method comprising:

receiving, by a webpage provider server via the wireless network from the mobile communication device executing at least one application via at least one processor, a webpage request to provide a webpage;

responsive to receiving the webpage request, determining, by a delegator on the webpage provider server, whether to delegate interaction with an intelligent content distributor server to the mobile communication device based on a speed of resolving commercial content, where resolving commercial content includes determining and obtaining actual addresses of commercial content provided by the intelligent content distributor server, wherein the commercial content is stored in a non-transitory database coupled to the intelligent content distributor server, the commercial content comprising at least one of text data structure, image data structure, video data structure, and other data associated with content for a good or service to include in a graphical user interface on the mobile communication device;

in response to the speed of resolving commercial content being equal to or greater than a threshold speed, determining, by the webpage provider server, that the webpage should be prepared such that the webpage provider server delegates interactions with the intelligent content distributor server to the mobile communication device for resolving commercial and such that the webpage provider server does not serve as an intermediary between the mobile communication device and the intelligent content distributor server for resolving commercial content;

preparing, by the webpage provider server, the webpage by at least providing embedded references of temporary addresses for the intelligent content distributor server within the webpage but not providing links of actual addresses of commercial content, where preparing the webpage with the embedded references of temporary addresses delegates interactions with the intelligent content distributor server to the mobile communication device for resolving commercial content without the webpage provider server serving as an intermediary;

providing, to the mobile communication device by the webpage provider server via the wireless network, the webpage;

receiving, by the mobile communication device, the webpage prepared by the webpage provider server;

in response to receiving the webpage, transmitting, by the mobile communication device to the intelligent content distributor server without the webpage provider server serving as an intermediary, a request to provide actual addresses of commercial content based on the embedded references of temporary addresses that delegated interactions with the intelligent content distributor server to the mobile communication device;

in response to transmitting the request to provide actual addresses, receiving, by the mobile communication device from the intelligent content distributor server without the webpage provider server serving as an intermediary, the actual addresses of commercial content based on the embedded references of temporary addresses;

obtaining, by the mobile communication device from the intelligent content distributor server, commercial content for the webpage based on the actual addresses of commercial content; and rendering, on the mobile communication device, the webpage with the commercial content obtained based on the actual addresses.

2. The method of claim 1, wherein the webpage provides details of a size and shape for commercial content.

3. The method of claim 1, wherein preparing the webpage with the embedded references of temporary addresses delegates all interaction with the intelligent content distributor server to the mobile communication device via the wireless network in response to the speed of resolving commercial content being at least equal to the threshold speed.

4. The method of claim 1, wherein at least some interaction with the intelligent content distributor server is delegated to the mobile communication device in response to the mobile communication device meeting at least one criterion related to hardware capabilities of the mobile communication device.

5. The method of claim 1, wherein commercial content is to be displayed responsive to a user of the mobile communication device scrolling to a portion of an advertising inventory data structure in the webpage where the commercial content is to be displayed, and wherein the advertising inventory data structure comprises locations in the webpage to display commercial content.

6. The method of claim 5, wherein the advertising inventory data structure exists on a graphical user interface of at least one of a browser, game, or other third-party application executing on the at least one processor of the mobile communication device.

7. The method of claim 1, further comprising receiving a count of an impression based on a user clicking the commercial content after scrolling to the commercial content in the graphical user interface of the mobile communication device.

8. A method of resolving commercial content on a mobile communication device via a wireless network, the method comprising:

receiving, by a webpage provider server via the wireless network from the mobile communication device executing at least one application via at least one processor, a webpage request to provide a webpage;

responsive to receiving the webpage request, determining, by a delegator on the webpage provider server, whether to delegate interaction with an intelligent content distributor server to the mobile communication device based on a speed of resolving commercial content, wherein resolving commercial content includes determining and obtaining actual addresses of commercial content provided by the intelligent content distributor server, and wherein the commercial content comprising at least one of text data structure, image data structure, video data structure, and other data associated with content for a good or service to include in a graphical user interface on the mobile communication device;

in response to the speed of resolving commercial content being equal to or greater than a threshold speed, determining, by the webpage provider server, that the webpage should be prepared such that the webpage provider server delegates interactions with the intelligent content distributor server to the mobile communication device for resolving commercial and such that the webpage provider server does not serve as an intermediary between the mobile communication device and the intelligent content distributor server for resolving commercial content;

preparing, by the webpage provider server, the webpage by at least providing embedded references of temporary addresses for the intelligent content distributor server within the webpage but not providing links of actual addresses of commercial content to the mobile communication device, where preparing the webpage with the embedded references of temporary addresses delegates interactions that cause the mobile communication device to obtain commercial content without the webpage provider server serving as an intermediary between the mobile communication device and the intelligent content distributor server;

providing, by the webpage provider server via the wireless network, the webpage to the mobile communication device;

receiving, by the mobile communication device, the webpage prepared by the webpage provider server;

in response to receiving the webpage, transmitting, by the mobile communication device to the intelligent content distributor server without the webpage provider server serving as an intermediary, a request to provide actual addresses of commercial content based on the embedded references of temporary addresses that delegated interactions with the intelligent content distributor server to the mobile communication device;

in response to transmitting the request to provide actual addresses, receiving, by the mobile communication device from the intelligent content distributor server without the webpage provider server serving as an intermediary, the actual addresses of commercial content based on the embedded references of temporary addresses;

obtaining, by the mobile communication device from the intelligent content distributor server, commercial content for the webpage based on the actual addresses of commercial content, where the mobile communication device caches the commercial content and wherein responsive to a request for the commercial content, the mobile communication device recalls a cached version of the commercial content from a non-transitory memory on the mobile communication device; and prioritizing, by the webpage provider server for the intelligent content distributor server, distribution of the commercial content for the mobile communication device based on characteristics of at least one of a requesting application associated with the webpage request and a user profile associated with the requesting mobile communication device, the user profile being stored in a non-transitory database coupled to the wireless network.

9. The method of claim 8, wherein resolution of commercial content is delayed until a user of the mobile communication device scrolls to a portion of an advertising inventory data structure in the webpage where the commercial content is to be displayed, wherein the advertising inventory data structure comprises locations in the webpage to display commercial content, and wherein the caching is discontinued when an amount of unused memory on the mobile communication device is less than a threshold.

10. The method of claim 8, further comprising counting an impression from the mobile communication device responsive to a user clicking the commercial content after scrolling to at least a location on the webpage displayed in a graphical user interface of the mobile communication device.

11. The method of claim 8, further comprising distributing, via the intelligent content distributor server, commercial content based on giving a higher priority for a browser application than a priority for a gaming application.

12. The method of claim 8, wherein the prioritization of distribution of commercial content is in response to a user having a higher likelihood of purchasing a product via the wireless network using an advertising inventory data structure, and wherein the higher likelihood is determined by the webpage provider server by referencing a profile stored in a non-transitory database associated with the user that exceeds a threshold of product purchases.

13. The method of claim 8, wherein the distribution of commercial content is given higher priority in response to a user having a higher likelihood of responding to the commercial content via the wireless network using an advertising inventory data structure, and wherein the higher likelihood is determined by the webpage provider server by referencing a profile stored in a non-transitory database associated with the user that exceeds a threshold.

14. A method for resolving commercial content on a mobile communication device coupled to a wireless network, comprising:

receiving, by a webpage provider server via the wireless network from the mobile communication device executing at least one application via at least one processor, a webpage request to provide a webpage;

determining whether to delegate interaction with an intelligent content distributor server to the mobile communication device based on a speed of resolving commercial content, where resolving commercial content includes determining and obtaining actual addresses of commercial content provided by the intelligent content distributor server;

in response to the speed of resolving commercial content being equal to or greater than a threshold speed, determining, by the webpage provider server, that the webpage should be prepared such that the webpage provider server delegates interactions with the intelligent content distributor server to the mobile communication device for resolving commercial and such that the webpage provider server does not serve as an intermediary between the mobile communication device and the intelligent content distributor server for resolving commercial content;

preparing, by the web page provider server, the webpage by at least providing embedded references of temporary addresses for the intelligent content distributor within the webpage but not links of actual addresses of commercial content, where preparing the webpage with the embedded references of temporary address links delegates interactions with the intelligent content distributor server to the mobile communication device without the webpage provider server serving as an intermediary;

providing, to the mobile communication device by the webpage provider server via the wireless network, the webpage;

receiving, by the mobile communication device, the webpage from the webpage provider server;

in response to receiving the webpage, transmitting, by the mobile communication device to the intelligent content distributor server without the webpage provider server serving as an intermediary, a request to provide actual addresses of commercial content based on the embedded references of temporary addresses that delegated interactions with the intelligent content distributor server to the mobile communication device;

in response to transmitting the request to provide actual addresses, receiving, by the mobile communication device from the intelligent content distributor server without the webpage provider server serving as an intermediary, actual addresses of commercial content based on the embedded references of temporary addresses;

obtaining, by the mobile communication device from the intelligent content distributor server, commercial content for the webpage based on the actual addresses of commercial content; and rendering, on the mobile communication device, the webpage with the commercial content obtained based on the actual addresses.

15. The method of claim 14, further comprising: caching, by the mobile communication device, commercial content in a non-transitory memory on the mobile communication device.

16. The method of claim 15, wherein the caching is discontinued in response to an amount of unused memory on the mobile communication device being less than a threshold amount of unused memory.

17. The method of claim 14, wherein the commercial content comprises at least one of text data, image data, and video data that is associated with a good or service.

18. The method of claim 14, further comprising: prioritizing, by the webpage provider server for the intelligent content distributor server, distribution of the commercial content for the mobile communication device based on characteristics of at least one of a requesting application associated with the webpage request and a user profile associated with the requesting mobile communication device.

19. The method of claim 14, further comprising: counting, by the mobile communication device, an impression from the mobile communication device responsive to a user clicking the commercial content after scrolling to at least a location on the webpage displayed in a graphical user interface of the mobile communication device.

20. The method of claim 14, wherein the actual addresses of commercial content received by the mobile communication device from the intelligent content distributor are based on a user profile associated with the mobile communication device.

* * * * *